March 21, 1967 C. W. HARGENS III 3,310,681
OPTICAL FILAMENTARY PHOTOCELL DEVICE HAVING SPACED
ELECTRICAL CONDUCTORS ARRANGED IN A MATRIX
Filed April 10, 1963

INVENTOR:
CHARLES WILLIAM HARGENS, III
BY Howson & Howson
ATTYS.

3,310,681
OPTICAL FILAMENTARY PHOTOCELL DEVICE HAVING SPACED ELECTRICAL CONDUCTORS ARRANGED IN A MATRIX
Charles W. Hargens III, Philadelphia, Pa., assignor to The Franklin Institute, Philadelphia, Pa., a corporation of Pennsylvania
Filed Apr. 10, 1963, Ser. No. 271,949
3 Claims. (Cl. 250—227)

This invention relates to a filamentary photocell device or photosensor and has for an object the provision of apparatus which utilizes small light conducting rods or filaments, which can be of a size in the order of 0.001" diameter, alone or grouped together at one end and spaced apart at the other end in an array arranged to produce electrical signals for information or control purposes.

In one of its phases the invention provides an improved cell for converting light rays travelling through a light conducting rod or filament into electrical impulses to be used for various purposes.

In another of its phases the invention provides an assembly of small optical filaments for scanning an object and transmitting differentiated light signals to equipment at a distance where the light signals are converted into electrical signals to be utilized in various ways. It is possible to group the filaments into a small group at one end, as for scanning and to spread them out at the other end for image dissection, signal conversion and the like.

The invention also provides a cross sectional matrix signal read-out arrangement which preserves the identity of the signal from each of a plurality of optical filaments whereby information imparted by an array of filaments can be preserved in an orderly fashion.

As is now known, an optical rod of such small size (as small as 0.001") as to be classed as a fiber or filament will transmit rays of light along its length from one end to the other if the surface of the rod is of a suitable nature to cause boundary reflections which prevent lateral emergence of the light rays. Normally a light ray transmitter into one end of an optical rod emerges as a light ray at the other end. Such a small light ray, as such, has very little energy and cannot transform its energy readily at the end of a filament in ways useful to other forms of energy transmitting and conversion systems, the most common and versatile of which is the electrical system.

According to the present invention an improved and simplified arrangement is provided for converting the light signals into electrical signals. This is accomplished by roughening a portion of the length of the light conducting rod, as by etching, to destroy the reflective surface to cause the local emergence of light rays, coating the roughened portion with light sensitive electrically conductive material, and connecting the ends of this portion in an electrical circuit. By this arrangement a photo-electrical conversion or transducer cell is provided which has enough length and area of photo-electrical sensitive material to provide a reliable electrical signal due to the presence or absence of a light signal through the rod.

By covering the coated portion with a light excluding covering or sheath the disturbing effects of light originating outside the light conducting rod are avoided.

By connecting one end of the coated portion to a conductor in one group of a crossed array or matrix of conductors and connecting the other end to a conductor of another group there is provided a means of identifying the signal from each of an array of a plurality of optical fiber cells and thereby transmitting orderly information derived from a closely packed group of filament ends arranged for scanning material to be studied, which information may be transmitted or stored.

The objects of the invention as well as various features of novelty and advantages will be apparent from the following description of an exemplary embodiment, reference being made to the accompanying drawings wherein.

Figure 1:
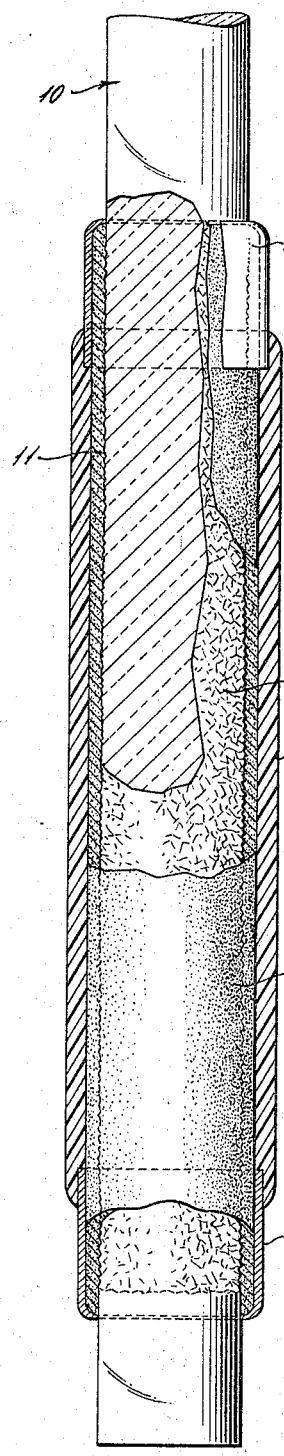
FIG. 1 is a very greatly enlarged elevation and section of a portion of the length of an optical filament showing a conversion cell embodying the present invention.

An optical rod, fiber or filament is indicated by the numeral 10. Such optical filaments per se are known. They may be formed of glass or certain plastics having a diameter as small as 0.001" or less and are quite flexible. They may be several feet long and will carry a beam of light from one end to the other very efficiently even when bent in any direction.

Transmission of a beam of light through the length of the rod or filament occurs by repeated reflections from the outer boundary surface.

According to the present invention, at a selected portion 11 along the length of the rod the outer surface is roughened around the circumference, as by etching or in various other ways, to render it non-reflective and thereby allow light rays to emerge.

The escape of light through the walls of the etched fiber results from rays striking minute areas at angles which are less than "critical." The term "critical" is defined in texts on optics such as Optics, F. W. Sears, Addison-Wesley, Cambridge, Mass., page 28. Such rays pass through to some extent depending upon their angle of incidence and their polarization.

The etching process for such fine glass filaments as those used in fiber optics is somewhat critical. If the etch is not carefully controlled, the glass filament becomes extremely brittle. However, this process provides a simpler means of extracting light than any other now known and performs well when done correctly.

Cleaning of the fibers before the etch is applied must completely remove all oils such as those deposits which result from handling the fibers with bare fingers. Very poor and uneven etching is apparent when cleaning is incomplete. Commercial solvents are adequate for removal of all grease from the glass.

Upon this roughened area, which though small in circumference is of considerable length, there is deposited a coating 12 of photosensitive material which changes in its electrical resistance characteristics in the presence of light. Usually most such materials become conductive in the presence of light and non-conductive when the light is removed. Such materials are well known and include cadmium or lead sulphide, silver selenide, selenium, germanium, and others. After being deposited the layer of material is stabilized and adhered, as by being fused or sintered.

At the ends of the length of coating material electrodes 13 and 14 are provided, as by vacuum deposition. To these electrodes specially arranged electrical conductors may be connected by appropriate means, such as dip soldering.

In order to prevent influence upon a cell by outside light, as from an adjacent cell or other source, the coated area is covered by an opaque layer 15 of any suitable insulating material applied by spraying, dipping, vapor deposit or other suitable manner.

Figure 2:
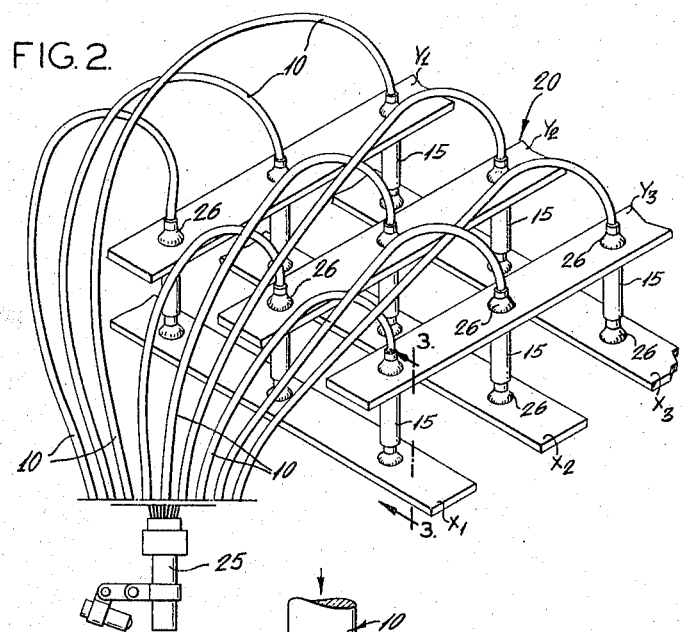
FIG. 2 is a perspective view of a matrix conversion or transducer unit.

As shown in FIG. 2, the cells are connected in a matrix 20 of two coordinate groups of conductors designated as $x1$, $x2$, $x3$, etc. and $y1$, $y2$, $y3$, etc., which lead to some responsive instrumentation capable of performing operations of coincidence logic. Each cell is uniquely connected to two conductor strips and thereby its signal when produced can be distinguished from that of all other cells and registered, recorded and identified accordingly.

Then when the other ends of the elements 10 are collected in a tight array 25 having a fixed predetermined geometrical arrangement and scanned over a pattern of information which is selectively illuminated, as by transmission through the pattern or reflection from the pattern, the effects from the pattern will be transmitted through the elements to the cells and from the cells to the coordinate matrix of conductors.

Figure 3:
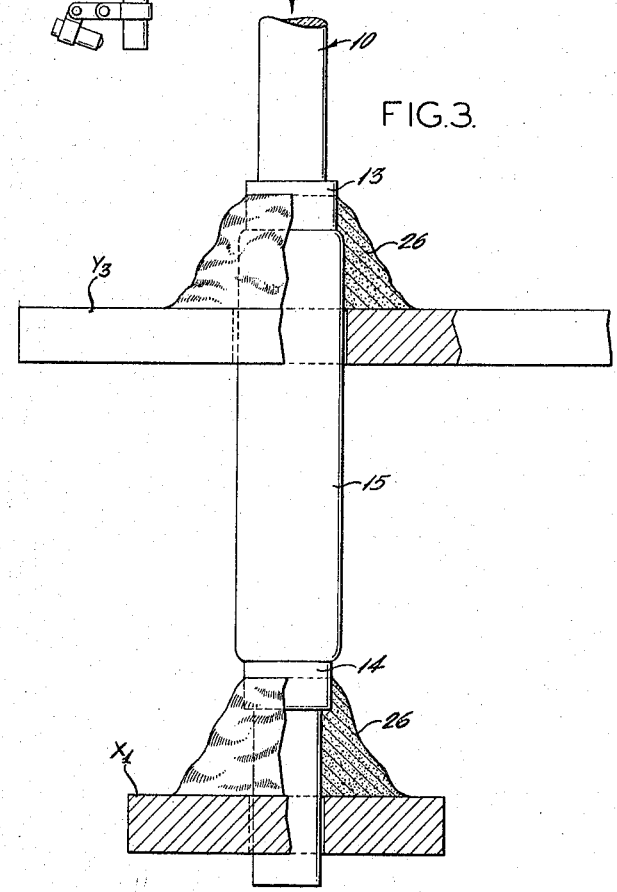
FIG. 3 is an enlarged section taken on the line 3—3 of FIG. 2.

The manner of connecting the electrodes 13, 14 of the cells to the $x$, $y$ conductors is shown in FIG. 3. They are connected by adherent junctions 26 of solder or vapor deposited material. The ends of the elements 10 are left exposed below the matrix for possible utilization of light rays emerging directly therefrom or transmitted thereto in the opposite direction from that of the original oncoming, modulated light ray.

It will be apparent that the intensity of the light transmitted to each cell will affect the amount of current conducted through the cell, hence the device can distinguish degrees of illumination and present a shaded mosaic image like that of a compound eye if this is desired. For coding and code transmission, full on or full off lighting conditions for yes-no signals, such as for binary codes, may be used if desired. Image dissecting arrangements of high resolution can also be made.

The development of a high resolution photosensor image dissector with digital outputs in parallel would be a very important addition to engineers' equipment. There is an increasing need for devices for reading data directly from the printed page. Present image dissectors employ the principle of serial examination or point scanning in a time sequence of the various image patterns. This is commonly referred to as a flying-spot scanning system and is best known in television. In this type of scanner the data are produced in serial form. This is not as efficient as the system which the eye employs where thousands of photosensors operate in parallel and transmit their mosaic of information simultaneously. Truly high-speed character recognition and reading devices will need to employ a parallel rather than a serial system.

The construction of a parallel sensing image dissector is herein provided by the use of fiber optics and filamentary photosensors. Not only do these photosensors have the capability of operating on a digital basis, that is, producing on-off signals for each fiber, but they can also produce signals of varying levels. Under such circumstances the quantity of information begins to be comparable to that handled by the eye. The simplest image dissectors would employ a few hundred optical fibers and cells, but these can readily by the present system be increased into the thousands. Because of their space saving qualities and general adaptability, these systems can also employ a certain amount of redundancy by duplicating channels.

A number of methods for the physical application of photosensitive materials to optical fibers are known. Methods for mechanical mounting and handling of the electrical circuit are available through developments in the field of micromodule fabrication.

The field of character recognition has been mentioned as an application of optical fiber photosensor image dissection. Character recognition is being applied for reading addresses on envelopes and for the direct entry of typewritten data into digital computers and special purpose data processors. Photo-reconnaissance analysis would be a useful military application. Either live or static data can be handled. A radar scope image fed into a decision making process by this system would be much faster and more reliable than a human operator.

These are but a few fields where the present improvement could be advantageously employed.

It is thus seen that the invention provides an improved photosensor cell and an improved system utilizing it for transmitting useful information for many purposes.

While one embodiment of the invention has been described for purposes of illustration it is to be understood that there may be various embodiments and modifications within the general scope of the invention.

I claim:

1. An optical filament photocell device, comprising in combination, a plurality of optical filaments each of dimensions to produce internal total reflection to thereby conduct light along its length and collected together closely at one end to scan material, each of said filaments having an integral light responsive optical-electrical photocell adjacent its other end, said photocell including a photoconductive material applied to the filament so that it is energized by light within the filament and spaced electrical conductors along the filament conductively connected to said photoconductive material and providing electrode, and a matrix comprising a plurality of coordinate conductive elements in two groups, one of the electrical conductors of each said photocell being connected to one of the coordinate conductive elements of said matrix of one group and the other conductor of the same photocell being connected to one of the coordinate conductive elements of the other group.

2. A device as set forth in claim 1, in which said optical filaments at one end are closely bound in a mosaic to form a pick-up head, and in which the filaments at a distance from the pick-up head are spread apart at said photocells and electrical connections.

3. A device as set forth in claim 1, in which the coordinate conductive elements are spacing conductor bars said optical filaments at the photocell electrodes being connected at one end to conductor bars providing coordinate matrix elements of one group and at the opposite end to conductor bars providing coordinate matrix elements of the other group and in which said electrodes are rigidly connected to said bars to space the bars in the respective groups apart by approximately the length of the photocells.

References Cited by the Examiner

UNITED STATES PATENTS

| | | | |
|---|---|---|---|
| 1,751,584 | 8/1927 | Hansell | 250—227 X |
| 2,342,245 | 2/1944 | Bruce et al. | 250—208 X |
| 3,056,031 | 12/1959 | McNaney | 250—227 X |
| 3,088,037 | 4/1963 | Baum | 88—1 |
| 3,182,200 | 5/1965 | McNaney | 250—227 |
| 3,191,040 | 6/1965 | Critchlow | 250—213 |

RALPH G. NILSON, *Primary Examiner.*

S. ELBAUM, *Assistant Examiner.*